INVENTOR.
ROBERT F. WEST
FRANK J. KUCHTA
BY WOJCIECH S. GUTOWSKI

ATTORNEY

INVENTORS
WOJCIECH STANLEY GUTOWSKI
FRANK JOSEPH KUCHTA
ROBERT FERGUSON WEST
BY Peter L. Costas
Attorney United States Patent Office 3,488,868
Patented Jan. 13, 1970

3,488,868
MEASURING TOOL
Wojciech Stanley Gutowski, Southington, Conn., Frank Joseph Kuchta, Redondo Beach, Calif., and Robert Ferguson West, Simsbury, Conn., assignors to The Stanley Works, New Britain, Conn., a corporation of Connecticut
Continuation-in-part of application Ser. No. 676,219, Oct. 18, 1967. This application Apr. 1, 1969, Ser. No. 814,513
Int. Cl. B43l 7/00, 13/00; G06g 1/00
U.S. Cl. 33—103        10 Claims

ABSTRACT OF THE DISCLOSURE

The device has a body portion with a pair of legs intersecting at a right angle and a convexly arcuate web extending therebetween and having angle measuring indicia thereon. The legs are of sufficient width to seat stably against planar surfaces for use as a level or a square and the web portion is at least in part coplanar with one edge surface of the legs so as to provide stable planar seating on such surfaces. One of the legs has a channel therein which slidably and removably seats an elongated measuring blade, and releasable retaining means on the leg is engageable with the blade to fix it in a given position.

REFERENCE TO THE RELATED APPLICATION

This application is a continuation-in-part of our copending application, Ser. No. 676,219, filed Oct. 18, 1967, and entitled Measuring Tool, now abandoned.

BACKGROUND OF THE INVENTION

Generally, various tools are customarily used by the craftsman for measuring and aligning functions. One of the most useful tools is a combination T-square and level which permits the user to scribe straight lines, establish right angles, verify the planar nature of a surface and related functions. Some of such tools also permit the establishment of a 45° angle to one surface of a body member. By providing slidable measuring blade members such tools may be used to measure depth of relatively wide holes in a surface.

Oftentimes, the craftsman has a need to make other determinations which require additional tools such as a protractor to determine some given angle, or a compass or line to scribe a circle, or a gauge to measure nail, screw or dowel sizes. A separate tool may be required as a saw guide, and a nail or awl may also be necessary for a scribing or measuring function.

It is an object of the present invention to provide a measuring tool which is relatively simple and rugged in construction and which is highly versatile in performing a wide variety of measuring functions.

It is also an object to provide such a tool which has a body portion and disengageable members for utilization apart from the body portion.

A specific object is to provide such a tool which is so constructed as to permit functioning for a multiplicity of purposes including a T-square, compass, protractor, level, plumb and the like.

SUMMARY OF THE INVENTION

It has now been found that the foregoing and related objects can be readily attained in a measuring tool which has a unitary rigid body member with a pair of legs intersecting at a right angle at one end thereof and a convexly arcuate web extending between the opposite ends of the legs. The legs have outer surfaces including or defining the right angle and edge surfaces at each side thereof. The arcuate web has measuring indicia spaced along the length thereof indicating the angle included between the intersection of the legs, the outer surface of a leg and a given indicium. The legs have outer surfaces of sufficient width that they may seat stably upon or against a planar surface and the web has at least the portion thereof having the measuring indicia coplanar with one of the side edge surfaces of both legs so that the tool may lie on its side stably upon a planar surface.

One of the legs is provided with a channel extending from end to end and opening at its outer surface, and an elongated measuring blade is slidably and removably seated in the channel. Releasable retaining means on the one leg having the channel is engageable with the blade so as to position it in fixed position within the channel. The blade is of greater length than the leg in which it is received so as to project beyond at least one end thereof, and bears indicia thereon desirably cooperating with the length of such leg so as to permit facile measurement by butting one end of the leg against a surface to or from which a measurement is to be taken.

The measuring blade and channel are cooperatively dimensioned and configured so that the blade is firmly seated within the channel with the outer edge thereof being secured by the retaining means adjacent the outer surface of the leg having the channel therein. In accordance with one embodiment, the blade is secured so that its outer edge is substantially coplanar with the outer surface of the leg to stable seating on a planar surface when for use as a level or square. In another embodiment which is preferred from the standpoint of use of the tool for scribing lines longitudinally of the blade or for a saw guide, the blade outer edge extends somewhat beyond the outer surface of the leg but not so much as to detract from the stability of its mounting therein. In a further embodiment, the channel and/or retaining means may be so configured as to permit mounting of the blade in either a flush or a projecting position.

In its preferred aspect, the blade has a multiplicity of apertures therein at predetermined spacing so that it may be fixed adjacent one end at a point by means of an element extending through one of such apertures when withdrawn from the body member. When a scribing element is inserted through another of the apertures, it will scribe an arc or circle of predetermined radius as the free end of the blade is rotated about the fixed point. One or more levels may be affixed to the legs so as to permit determination of level and plumb, and the legs and web desirably have apertures therein for various measurements such as the size of dowels, nails and screws. To provide maximum utility, a scribing member is releasably retained in the body portion and may be used to position fixedly the one end of the blade for scribing an arc or circle.

DESCRIPTION OF THE PREFERRED EMBODIMENTS

Figure 1:
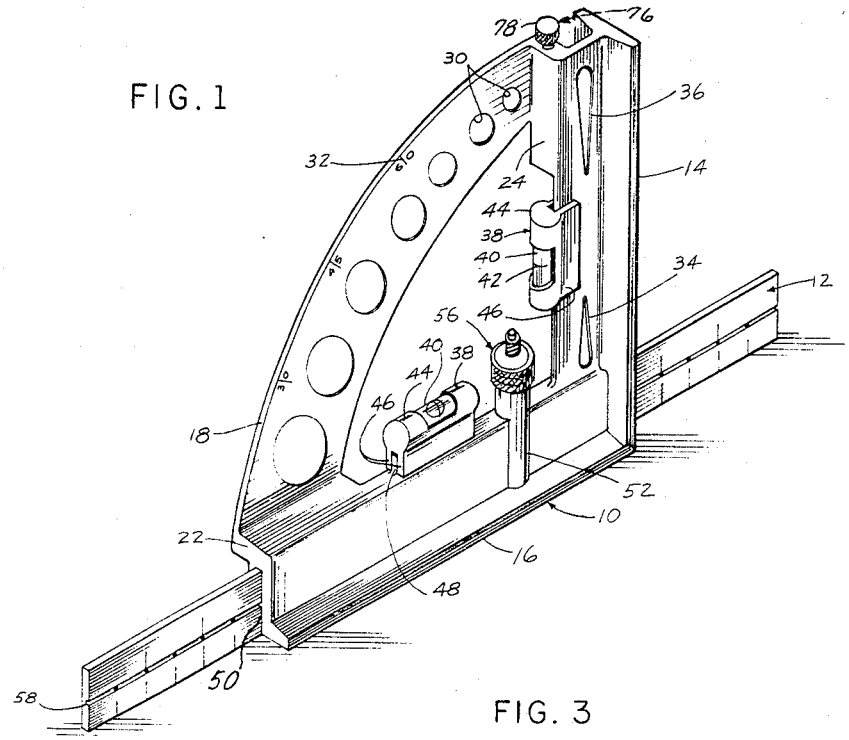
FIGURE 1 is a perspective view of a measuring tool embodying the present invention.
Figure 3:
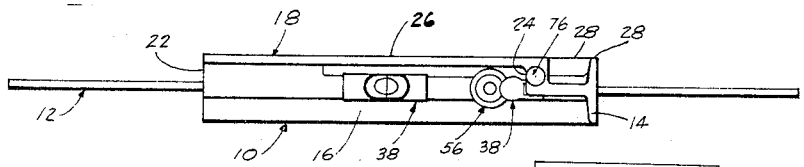
FIGURE 3 is a plan view thereof.

Turning first to the embodiment of FIGURES 1–5 of the attached drawings in detail, there is illustrated a measuring tool embodying the present invention and having an integrally formed body member generally designated by the numeral 10 and an elongated measuring blade generally designated by the numeral 12. The body member 10 has a pair of legs 14, 16 of generally T-shaped cross-section with intersect at a right angle at one end thereof, and a web 18 with a convexly arcuate body portion 20 and arm portions 22, 24 at the ends thereof. The arm portions 22, 24 join to the legs 14, 16 and are dimensioned to space the body portion 20 so that its one side surface 26 is coplanar with the side edge surfaces 28 of the legs 14, 16.

Within the body portion 20 and spaced along the length thereof are a multiplicity of apertures 30 of different diameter which may be used to measure dowels, tubing and the like. Indicia (not shown) of the size of the several apertures 30 may be integrally formed in the material of the body portion 20 or affixed thereto by printing, decals or the like. Spaced along the outer edge of the arcuate body portion 20 of the web 18 are a multiplicity of indicia 32 of included angle provided by radial lines and numbers. Such indicia are preferably integrally formed in the material of the body portion 20 although they may also be affixed thereto by printing, decals or the like.

The leg 14 has a pair of apertures 34, 36 therein with converging side walls configured and dimensioned to permit measurement of the size of screws and nails. Suitable indicia (not shown) are provided on the leg 14 adjacent the apertures to identify the pertinent information. For example, the aperture 34 may be used for common nails, and the shank of the nail slid along the aperture until tightly received therein, at which point the identifying indicium may be read. Similarly, the aperture 36 may be used for screws by inserting the screw therein until the head is sliding on the surface of the leg and then sliding the screw toward the converging end until the screw is tightly received, at which point the identifying indicium is read.

To determine level and plumb with the tool, a pair of levels generally designated by the numeral 38 is mounted on the legs 14, 16. Each of the levels 38 includes a conventional liquid filled tube 40 with center line 42 and a housing 44 with a pair of leg portions 46 providing a channel therebetween. The inwardly extending portion of the leg 14 and level 38 are cooperatively dimensioned so as to seat the leg 14 snugly between the leg portions 46 for frictional engagement therebetween. Since the inwardly extending portion of the leg 16 is desirably of greater thickness to provide other necessary structural features, it has an inwardly extending boss 48 thereon which is dimensioned to seat snugly in the channel between the leg portions 46 of the other level 38.

The leg 16 has a channel or slot 50 extending throughout the length thereof and opening at its outer surface which is dimensioned substantially the same as the thickness of the measuring blade 12 which it receives. A generally cylindrical boss 52 on its inwardly extending portion has therein a cylindrical bore 54 extending normally to the channel 50 and communicating therewith and in which is seated the blade retaining assembly generally designated by the numeral 56 and to be described more fully hereinafter, as best seen in FIGURE 5.

The measuring blade 12 has a groove 58 in one side face thereof extending along its full length, and holes 60 therethrough are spaced along the length of the blade 12 at predetermined intervals, preferably each one-half inch. Suitable indicia 62 (only partially illustrated) of length are provided along the length of the bottom edge of the blade 12, preferably on both side surfaces. To permit use of the blade 12 as a compass as will be described more fully hereinafter, a second set of indicia 64 of length are provided along the length of the top edge of the blade, preferably only on one side surface and based upon measurement of length starting from the first of the holes 60 in the blade 12. A stud determining indicium 66 is also placed upon the blade 12 at a predetermined point which will provide an overall length of 16 inches for the body member 10 and blade 12 when the blade is extended so that the indicium 66 is at the outer surface of the leg 14. In the illustrated embodiment, the leg 16 is six inches in length so that the indicium 66 is at a point 10 inches along the length of the blade 12 to provide a total of 16 inches.

The blade 12 and channel 50 are cooperatively dimensioned in the embodiment of FIGURES 1–5 so that the outer edge surface of the blade 12 is substantially coplanar with the outer surface of the leg 16 to provide highly stable seating of the tool upon or against a planar surface and optimum determination of the planar character of a surface against which placed. In addition, the channel 50 and blade 12 are cooperatively dimensioned in width or thickness so that the blade 12 is slidably retained therein with only a small amount of clearance to minimize play therebetween.

Figure 5:
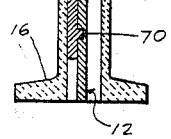
FIGURE 5 is a sectional view along the line 5—5 of FIGURE 2 but to a greatly enlarged scale.

The retaining assembly 56 secures the blade 12 in position within the channel 50 readily and firmly as best seen in FIGURE 5. The retaining bolt 68 has a threaded portion 70 adjacent its upper end and is of a diameter substantially equal to the diameter of the bore 54. At its lower or inner end, the retaining bolt 68 is milled so as to provide a tongue 70 which seats in the groove 58 of the blade 12 and so as to permit the body of the blade 12 to pass thereby in the channel 50 which is a lesser width than the bore 54. A knurled nut 72 is threadably received on the threaded portion 69 of the bolt 68, and a spring 74 acts between the edge surface of the cylindrical boss 52 and the nut 72.

To retain the blade 12 in position, the tongue 70 of the bolt 68 is seated in the groove 58 of the blade 12 and the knurled nut 72 is tightened to draw the blade 12 tightly against the bottom of the channel 50. To adjust the length of the blade 12, the knurled nut 72 is backed off sufficiently to release the pressure on the blade 12 and permit it to slide freely by the bolt 68 although the tongue 70 is still slidably seated within the groove 58.

The tool is completed by a scribe member generally designated by the numeral 76 and which has a knurled head 78 and an elongated pointed shank 80. The shank 80 of the scribe member 76 is frictionally retained in a sleeve member (not shown) which is seated in an aperture (not shown) in the edge of the arm portion 24 of the web 18. The sleeve member desirably has an externally serrated upper end portion to insure firm seating in the arm portion aperture and a split lower end providing inturned spring fingers to grip frictionally the shank 80 of the scriber 76 and retain it within the sleeve.

Figure 6:
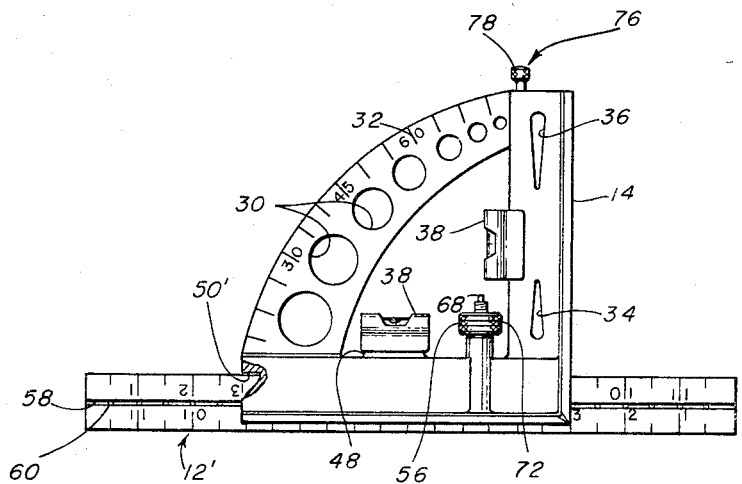
FIGURE 6 is a plan view of another embodiment of the measuring tool of the present invention.

Turning now to the embodiment of FIGURE 6, it is essentially the same in structure as that of FIGURES 1–5 except that the channel 50' in the body member 10 is milled to a slightly shallower depth which is about ⅛ inch less than the width of the blade 12'. As a result, the outer edge of the blade 12' projects beyond the outer surface of the leg 16 about ⅛ inch. Generally, projection of the edge of the blade edge 12' beyond the outer surface of the leg 16 from about 1/16 to ¼ inch is desirable for use of the tool in scribing lines since the pencil or other scribing tool need not come into contact with the outer surface of the leg 16. This slight projection is also advantageous when the tool is to be used as a saw guide since frictional contact between the tool and saw blade is limited. Although the blade may project as much as ⅜ inch, at this distance and at greater distances, the stability of the blade 12 within the body 10 is reduced or there is a need to increase the size of the components to provide equivalent stability with attendant disadvantages in size, weight and cost. The terminology "adjacent the outer surface" means a structure in which the blade edge is coplanar with the outer surface of the leg or projects therebeyond a distance of not more than ⅜ inch or less, and preferably not more than ¼ inch. If so desired, the blade 12 may include a pair of grooves 58 in which the tongue 70 may be engaged to provide for spacing of the blade 12 in either a flush or a projecting position, or other suitable means may be utilized to achieve alternate positioning thereof.

Figure 2:
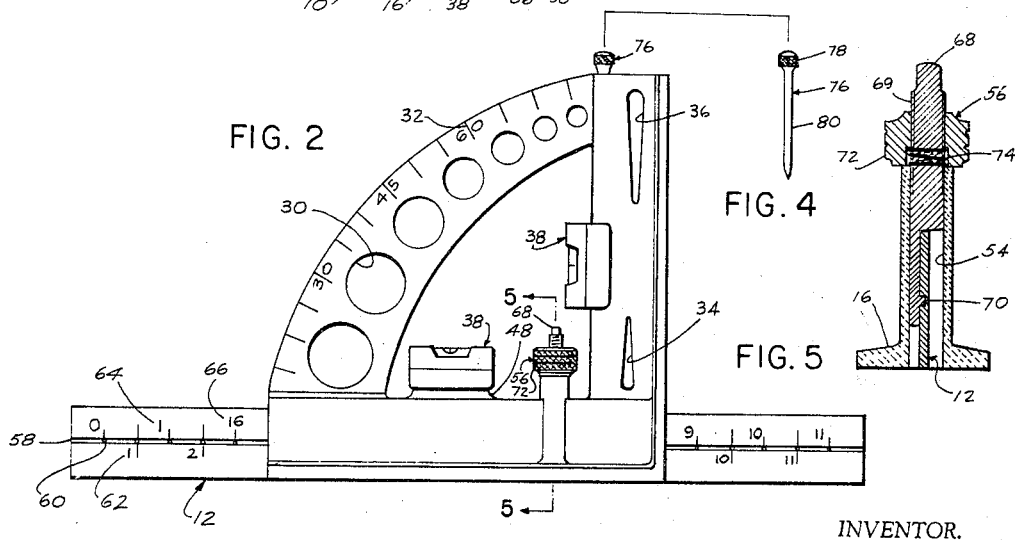
FIGURE 2 is a side elevational view thereof.
Figure 4:
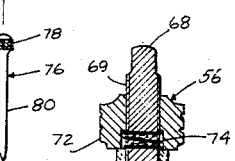
FIGURE 4 is an elevational view of the scriber withdrawn from its retaining aperture.

In using the embodiment of FIGURES 1–5 as a square, a level or a plumb, it can be seen that the blade 12 which is coplanar with the leg 16 of the body member provides an extended length of planar surface from which a reference measurement is to be made by moving the blade 12 to the left as seen in FIGURES 1 and 2. With either embodiment, the body member 10 may be butted up against a corner to determine whether the corner is square or right angular. It will also be appreciated that the blade 12 affords significant advantages in providing a guide for a saw, or the like, to ensure a square cut.

To use the tool as a depth gauge, the blade is extended to the right as indicated in FIGURES 1 and 2 and the leg 14 is placed against the planar surface about the aperture to be measured. The blade is extended until it bottoms in the aperture, and the knurled nut 72 is then tightened to lock it in this position. Thereafter the measurement of the length of the blade which is extending beyond the leg 14 may be read to determine the depth of the hole. To assist in locating studs, the blade 12 is extended until the indicium is aligned with the outer surface of the leg 14 to provide an overall length for the blade 12 and the leg 16 of 16 inches. Thereafter one end of the tool may be placed adjacent the center line of a known stud and the other end of the tool will be aligned approximately with the center line of the next adjacent stud, the planar surface of the web 18 and side edges of the legs 14, 16 providing stability for the operation. To use the tool as a marking gauge, the blade 12 is adjusted so that one of the holes 60 therein corresponds to the desired length from the outer surface of the leg 14. This is conveniently effected because of the indicia 64 which appear thereon. Then the scriber 76 or a pencil or another suitable device may be inserted into the hole 60 and the tool moved along the edge of the work piece so as to scribe the desired line along the length thereof.

Figure 7:
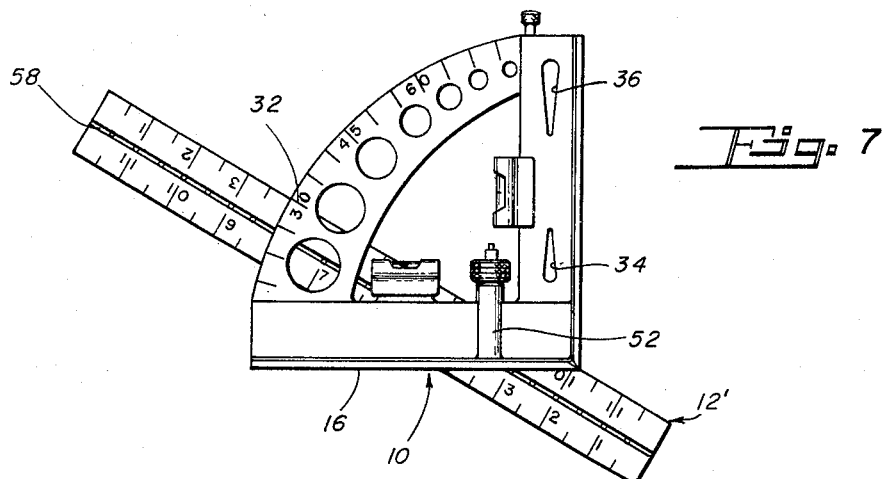
FIGURE 7 is a similar view with the blade removed and positioned for use of the tool as a protractor.

To establish a desired included angle, the body member 10 is placed upon the work surface with juncture between the legs 14, 16 registering with a mark indicating the base point. The proper angle is then marked by reference to the indicia 32 along the length of the web 18. Thereafter the blade 12 may be withdrawn from the body member 10 and aligned between the base point and the mark registering with the desired angle so as to provide a reference line for cutting or other suitable operations as is illustrated in FIGURE 7. It can be seen that the scriber 76 may be usefully employed for making both marks.

The present invention is also useful as a beam compass since the blade 12 may be removed from the body member. To scribe an arc or circle of predetermined radius, the blade member is first affixed or positioned at a desired reference point by extending a member through the first of the holes 60 therein. The scriber 76 is highly useful in securing the blade 12 in position because the steel tip permits relatively firm positioning. A pencil or other suitable marker in then inserted through a hole 60 corresponding to the desired radius and the blade 12 is pivoted or rotated about its fixed point to scribe the desired arc or circle.

As previously indicated the apertures 34 and 36 in the leg 14 are quite useful in determining the size of screws and nails. Similarly, the apertures 30 and the web 18 are useful for determining the diameter of dowels or like cylindrical materials. The tool may also be utilized for various other operations wherein a guide surface or a right angular member is desirable, and the blade 12 itself may be separated from the body member 10 for still further independent functioning requiring merely a straight edge.

As will be readily appreciated, the body member is desirably integrally formed of a relatively durable material such as metal or impact resistant plastics. Metal castings have proven to be highly satisfactory for the illustrated construction although injection molded and compression molded synthetic plastics may be equally well employed. The blade member 12 is desirably fabricated from a durable metal, and is conveniently formed from sheet stock with the holes drilled or punched therein at the desired locations. The several indicia on the blade member 12 may be formed by etching or stamping, or they may be imprinted thereon or affixed thereto in the form of decals. The indicia 32 for the degree marks and the indicia (not shown) useful in conjunction with the apertures 34 and 36 and the indicia useful for labeling the size of the apertures 30 are conveniently formed in the material of the body member 10 as initially fabricated. However, they too may be subsequently provided by etching, stamping, printing or decals.

Thus, it can be seen that the present invention provides a measuring tool which is relatively simple and rugged in construction and which is highly versatile in providing a wide variety of measuring functions. By providing the disengageable blade and scriber members, these elements may be used both in conjunction with the body member or apart therefrom for totally independent functions. The coplanar nature of the web and the side edge surfaces of the legs of the body member ensures stable placement of the tool upon a planar surface. Thus, the tool is adapted to a wide variety of functions as previously indicated to determine squareness, to determine the level nature of the surface, to determine perpendicularity, to measure depth of an aperture, to locate studs, to mark parallel lines, to lay out a desired included angle, to scribe an arc or a circle with a predetermined radius, to measure the diameter of dowels or the size of screws and nails, to provide a guide for a saw, etc.

Having thus described the invention, we claim:

1. A measuring tool comprising a unitary, rigid body member having a pair of legs intersecting at a right angle at one end thereof and a convexly arcuate web extending between the opposite ends of said legs, said legs having outer surfaces including said right angle and edge surfaces at each side thereof, said arcuate web having measuring indicia spaced along the length thereof indicating the angle included between the outer surface of a leg and an indicium, said legs having outer surfaces of sufficient width to permit stable seating thereof upon a planar surface and said web having at least the portion bearing said measuring indicia substantially coplanar with one of said side edge surfaces of both of said legs so as to permit stable seating of the tool upon said web portion and edge surfaces against a planar surface, one of said legs having a channel therein extending from end to end thereof and opening at the outer surface thereof; a elongated measuring blade slidably and removably seated in said channel and of greater length than said one leg so as to project beyond at least one end thereof; and releasable retaining means on said one leg engageable with said measuring blade to position said blade in fixed position in said channel, said measuring blade and channel are cooperatively dimensioned and configured so that the outer edge of said measuring blade is secured by said retaining means adjacent the outer surface of said one leg having said channel therein.

2. The measuring tool of claim 1 wherein said measuring blade and channel are cooperatively dimensioned with the outer edge of said measuring blade being substantially coplanar with the outer surface of said one leg having said channel therein.

3 The measuring tool of claim 1 wherein said measuring blade and channel are cooperatively dimensioned with the outer edge of said measuring blade projecting beyond the outer surface of said one leg having said channel therein a distance of less than about 3/8 inch.

4. The measuring tool of claim 1 wherein said body member has an aperture therein releasably retaining a scribing member.

5. The measuring tool of claim 1 wherein said body member has a plurality of apertures therein for measuring the size of fastening members.

6. The measuring tool of claim 1 wherein said one leg has a spirit level thereon for determination of the level nature of surfaces on which said one leg and blade may be placed.

7. The measuring tool of claim 1 wherein said measuring blade has a plurality of apertures spaced along the length thereof at predetermined intervals for insertion of the point of a marking tool therethrough.

8. The measuring tool of claim 1 wherein said blade has a groove in one surface thereof extending along its length and wherein said releasable retaining means includes a fastening element with a tongue slidable in said groove.

9. The measuring tool of claim 8 wherein said releasable retaining means includes a bolt providing said tongue and a nut threadable on end of said bolt extending outwardly from said one leg to draw said bolt and thereby said blade tightly against the innermost surface of said channel.

10. The measuring tool of claim 1 wherein said web has a multiplicity of apertures of increasing diameter spaced along the length thereof adapted to measure the diameter of dowels and the like.

References Cited

UNITED STATES PATENTS

| | | | |
|---|---|---|---|
| 426,001 | 4/1890 | Evans | 33—103 X |
| 1,139,648 | 5/1915 | Demmer | 33—94 |
| 2,404,911 | 7/1946 | King | 33—103 |

HARRY N. HAROIAN, Primary Examiner

U.S. Cl. X.R.

33—75, 95